US008213947B2

United States Patent
Plestid et al.

(10) Patent No.: US 8,213,947 B2
(45) Date of Patent: *Jul. 3, 2012

(54) METHOD AND APPARATUS FOR RADIO RESOURCE CONTROL PROFILE CREATION IN A UMTS NETWORK

(75) Inventors: Thomas Leonard Trevor Plestid, Ottawa (CA); Jeffrey William Wirtanen, Ottawa (CA); Muhammad Khaledul Islam, Ottawa (CA)

(73) Assignee: Research In Motion Limited, Waterloo, ON ( * ) Notice: Subject to any disclaimer, the term of this patent is extended or adjusted under 35 U.S.C. 154(b) by 0 days.

This patent is subject to a terminal disclaimer.

(21) Appl. No.: 13/307,676

(22) Filed: Nov. 30, 2011

(65) Prior Publication Data

US 2012/0076093 A1    Mar. 29, 2012

Related U.S. Application Data

(63) Continuation of application No. 11/673,784, filed on Feb. 12, 2007, now Pat. No. 8,090,380.

(51) Int. Cl.
*H04W 72/00*    (2009.01)
(52) U.S. Cl. ............ 455/450; 455/452.2; 455/422.1; 455/425; 370/230; 370/331
(58) Field of Classification Search ....... 455/450–452.2, 455/422.1–425; 370/230, 331
See application file for complete search history.

(56) References Cited

U.S. PATENT DOCUMENTS

| | | | |
|---|---|---|---|
| 6,009,331 A * | 12/1999 | Ueda | 455/450 |
| 6,961,570 B2 | 11/2005 | Kuo et al. | |
| 7,317,931 B2 | 1/2008 | Guo | |
| 7,324,474 B2 | 1/2008 | Shirota et al. | |
| 2001/0018342 A1 | 8/2001 | Vialen et al. | |
| 2001/0031634 A1 * | 10/2001 | Mizutani et al. | 455/425 |
| 2002/0141331 A1 | 10/2002 | Mate et al. | |
| 2003/0003895 A1 | 1/2003 | Wallentin et al. | |
| 2003/0207702 A1 | 11/2003 | Chen | |
| 2004/0102173 A1 | 5/2004 | Darabi | |
| 2004/0214589 A1 * | 10/2004 | Seon | 455/512 |
| 2004/0219939 A1 * | 11/2004 | Seon | 455/509 |
| 2004/0266467 A1 * | 12/2004 | Seon | 455/512 |

(Continued)

FOREIGN PATENT DOCUMENTS

WO    2005064962 A1    7/2005

(Continued)

OTHER PUBLICATIONS

ETSI: "TS 125 331 Universal Mobile Telecommunications System (UMTS)" ETSI TS 125 331 V3.1.0, XX, XX Jan. 2000, pp. 1-282, XP002165164 *pp. 99-106, paragraph 9*.

(Continued)

*Primary Examiner* — Jean Gelin
*Assistant Examiner* — Nathan Taylor
(74) *Attorney, Agent, or Firm* — Moffat & Co.

(57) ABSTRACT

A method for creating a radio resource control profile for a radio resource allocation or a state-transition profile having the steps of: receiving a parameter associated with a user equipment (UE); associating the parameter with the radio resource control profile for the radio resource allocation or the state-transition profile; and initiating the radio resource allocation or state transition profile for the UE.

16 Claims, 8 Drawing Sheets

U.S. PATENT DOCUMENTS

| | | |
|---|---|---|
| 2005/0026597 A1 | 2/2005 | Kim et al. |
| 2005/0141471 A1 | 6/2005 | Virtanen et al. |
| 2005/0143056 A1 | 6/2005 | Iyer et al. |
| 2005/0147040 A1 | 7/2005 | Vayanos et al. |
| 2005/0169205 A1 | 8/2005 | Grilli et al. |
| 2005/0193309 A1 | 9/2005 | Grilli et al. |
| 2006/0030326 A1 | 2/2006 | O'Neill et al. |
| 2006/0034213 A1 | 2/2006 | Munje et al. |
| 2006/0052137 A1 | 3/2006 | Randall et al. |
| 2006/0094478 A1* | 5/2006 | Kim et al. .................. 455/574 |
| 2006/0135172 A1* | 6/2006 | Dronne et al. ............ 455/452.2 |
| 2006/0250957 A1* | 11/2006 | Gielty et al. ................ 370/230 |
| 2006/0268835 A1 | 11/2006 | Hyotylainen et al. |
| 2006/0293067 A1 | 12/2006 | Leung et al. |
| 2007/0135080 A1 | 6/2007 | Islam et al. |
| 2007/0259673 A1 | 11/2007 | Willars et al. |
| 2008/0043648 A1 | 2/2008 | Buga et al. |
| 2008/0108346 A1 | 5/2008 | Umatt et al. |
| 2008/0132269 A1 | 6/2008 | Shen et al. |
| 2008/0182553 A1 | 7/2008 | Salkini et al. |
| 2008/0214220 A1 | 9/2008 | Beziot et al. |
| 2009/0067359 A1 | 3/2009 | Mademann |
| 2009/0070508 A1 | 3/2009 | Hildebrand et al. |
| 2009/0075669 A1 | 3/2009 | Franceschini et al. |
| 2009/0116478 A1 | 5/2009 | Hurtta et al. |
| 2009/0154403 A1 | 6/2009 | Niwano |
| 2009/0181685 A1* | 7/2009 | Ekstrom et al. ............... 455/450 |

FOREIGN PATENT DOCUMENTS

| | | |
|---|---|---|
| WO | 2005120104 A1 | 12/2005 |
| WO | 2006111014 | 10/2006 |
| WO | 2007097670 A1 | 8/2007 |

OTHER PUBLICATIONS

EP application No. 07102189.3, Extended European Search Report dated Jul. 25, 2007.

Canadian application No. 2,620,804, Office Action dated Jun. 17, 2011.

* cited by examiner

METHOD AND APPARATUS FOR RADIO RESOURCE CONTROL PROFILE CREATION IN A UMTS NETWORK

This application is a continuation of co-pending application Ser. No. 11/673,784, filed Feb. 12, 2007, which is incorporated herein by reference in its entirety.

FIELD OF THE APPLICATION

The present application relates to radio resource control and allocation between User Equipment (UE) and Universal Terrestrial Radio Access Network (UTRAN), and in particular to resource allocation during radio bearer setup and according to subscription, and transitioning between modes and states in a UMTS network.

BACKGROUND

A Universal Mobile Telecommunication System (UMTS) is a broadband, packet based system for the transmission of text, digitized voice, video and multi-media. It is a highly subscribed to standard for third generation and is generally based on Wideband Coded Division Multiple Access (W-CDMA).

In a UMTS network, a Radio Resource Control (RRC) part of the protocol stack is responsible for the assignment, configuration and release of radio resources between the UE and the UTRAN. This RRC protocol is described in detail in the 3GPP TS 25.331 specifications. Two basic modes that the UE can be in are defined as "idle mode" and "UTRA connected mode". UTRA stands for UMTS Terrestrial Radio Access. In idle mode, the UE is required to request a RRC connection whenever it wants to send any user data or in response to a page whenever the UTRAN or the Serving GPRS Support Node (SGSN) pages it to receive data from an external data network such as a push server. Idle and Connected mode behaviors are described in detail in 3GPP specifications TS 25.304 and TS 25.331 respectively. To be able to exchange data, a UE in idle mode first needs to set up a RRC Connection process, which moves it to one of the states of the connected mode. The UE is also assigned a radio bearer by the network as part of the process. Initial radio bearer resource configuration and any subsequent change in bearer configuration are controlled by the network.

When in a UTRA RRC connected mode, the device can be in one of four states. These are:
  CELL-DCH: A dedicated channel is allocated to the UE in uplink and downlink in this state to exchange data. The UE must perform actions as outlined in 3GPP 25.331.
  CELL_FACH: no dedicated channel is allocated to the user equipment in this state. Instead, common channels are used to exchange a small amount of bursty data. The UE must perform actions as outlined in 3GPP 25.331 which includes the cell selection process as defined in 3GPP TS 25.304.
  CELL_PCH: the UE uses Discontinuous Reception (DRX) to monitor broadcast messages and pages via a Paging Indicator Channel (PICH). No uplink activity is possible. The UE must perform actions as outlined in 3GPP 25.331 which includes the cell selection process as defined in 3GPP TS 25.304. The UE must perform the CELL UPDATE procedure after cell reselection.
  URA_PCH: the UE uses Discontinuous Reception (DRX) to monitor broadcast messages and pages via a Paging Indicator Channel (PICH). No uplink activity is possible. The UE must perform actions as outlined in 3GPP 25.331 including the cell selection process as defined in 3GPP TS 25.304. This state is similar to CELL_PCH, except that URA UPDATE procedure is only triggered via URA reselection.

The transition from an idle mode to the different states of connected mode and vise-versa is controlled by the UTRAN. The transition may not be optimal for all underlying services on the UE.

The problem with the above is that the RRC radio bearer allocation and adaptation as well as RRC state transition profile is static for every device connected to the network regardless of subscription profile. It could even be static for all the applications on the device. The subscription may be closely tied to the applications of a handset, such as that for always-on applications. If radio bearer allocation and adaptation is not based on the underlying application or subscription for which the UE initiates the RRC request, it could lead to suboptimal performance such as increase in latency, a reduction in effective data rate, etc. In addition, since the UTRAN controls when the RRC connected state is changed to a different, less battery intensive state or into an idle mode, a UE may be forced to stay in a higher data rate and intensive battery state than the required state or mode, thereby draining battery life and wasting network resources.

BRIEF DESCRIPTION OF THE DRAWINGS

The present application will be better understood with reference to the drawings in which.

DETAILED DESCRIPTION

The present system and method overcome the deficiencies of the prior art by providing for the setting of a RRC resource control profile based on the specific requirements of applications on the UE or based on the subscription of the UE. The resource control profile controls radio resource allocation/adaptation as well as state transitions.

In particular, the present method and apparatus can utilize the Access Point Name (APN) specified by the UE to set the transition profile between various states. This is another way of describing the subscription of the UE. As will be appreciated, the Home Location Register (HLR) stores relevant information about subscribers, and could provide the radio network controller (RNC) with the subscription of the UE. Other network entities could also be used to store subscription information centrally. Whether using the HLR or other network entity, information is preferably pushed to other network components such as the RNC and SGSN, which map subscription information to relevant physical parameters used during data exchange.

Further, if there are multiple PDP contexts that have different QoS requirement but share the same APN IP address, such as a primary context, secondary context, and so forth, a different transition profile can be used for each context. This could be signaled to the RNC through QoS or dedicated messages.

If multiple active PDP contexts are concurrently utilized, the lowest common denominator between the contexts can be used. For RRC state transition, if one application has a first PDP context that is associated with a transition profile in which the system moves from CELL_DCH state to a CELL_PCH or Idle state quickly, and a second PDP context is associated with a transition profile in which the system is to stay in the CELL_DCH state longer, the second profile in which the CELL_DCH state is maintained longer will override the first profile.

As will be appreciated by those skilled in the art, the lowest common denominator can be considered in two different ways. Lowest common denominator, as used herein, implies a longest time required before transitioning to a different state. In a first embodiment, the lowest common denominator may be the lowest of the activated PDPs. In an alternative embodiment, the lowest common denominator may be the lowest of the PDPs that actually have active radio resources. The radio resources could be multiplexed in a number of different fashions but the end result is the same.

In the above embodiment, a lookup table can be used by the UTRAN to determine the resource control profile for radio resources(s) to be assigned for different applications for a given RRC connection for the UE. The profile can be based on user subscription and stored on the network side at a network entity such as HLR or alternatively at the RNC since the RNC will have more up to date traffic resources available (i.e. data rates that can be granted). If higher data rates can be achieved shorter timeouts may be possible.

Instead of APN, other alternatives such the Quality of Service (QoS) parameters set in a Packet Data Protocol (PDP) Context activation or Modified PDP Context can be used. The QoS field can further include the QoS "allocation retention priority (Service data unit could be used to infer traffic data volumes)" in case of multiple PDP contexts sharing the same APN address or a subscription profile to set the transition profile. Further alternatives include dedicated messages to signal a resource control profile.

In a further embodiment, the UE itself can modify the QoS or dedicated message requirement dynamically, based on what applications are running and what the expected data exchange volume will be. While the APN based examples above are therefore static for each APN, the UE-directed QoS-based profile could be dynamic.

The present application therefore provides a method for creating a radio resource control profile for a radio resource allocation or a state-transition profile having the steps of: receiving a parameter associated with a user equipment (UE); associating the parameter with the radio resource control profile for the radio resource allocation or the state-transition profile; and initiating the radio resource allocation or state transition profile for the UE.

Figure 1:
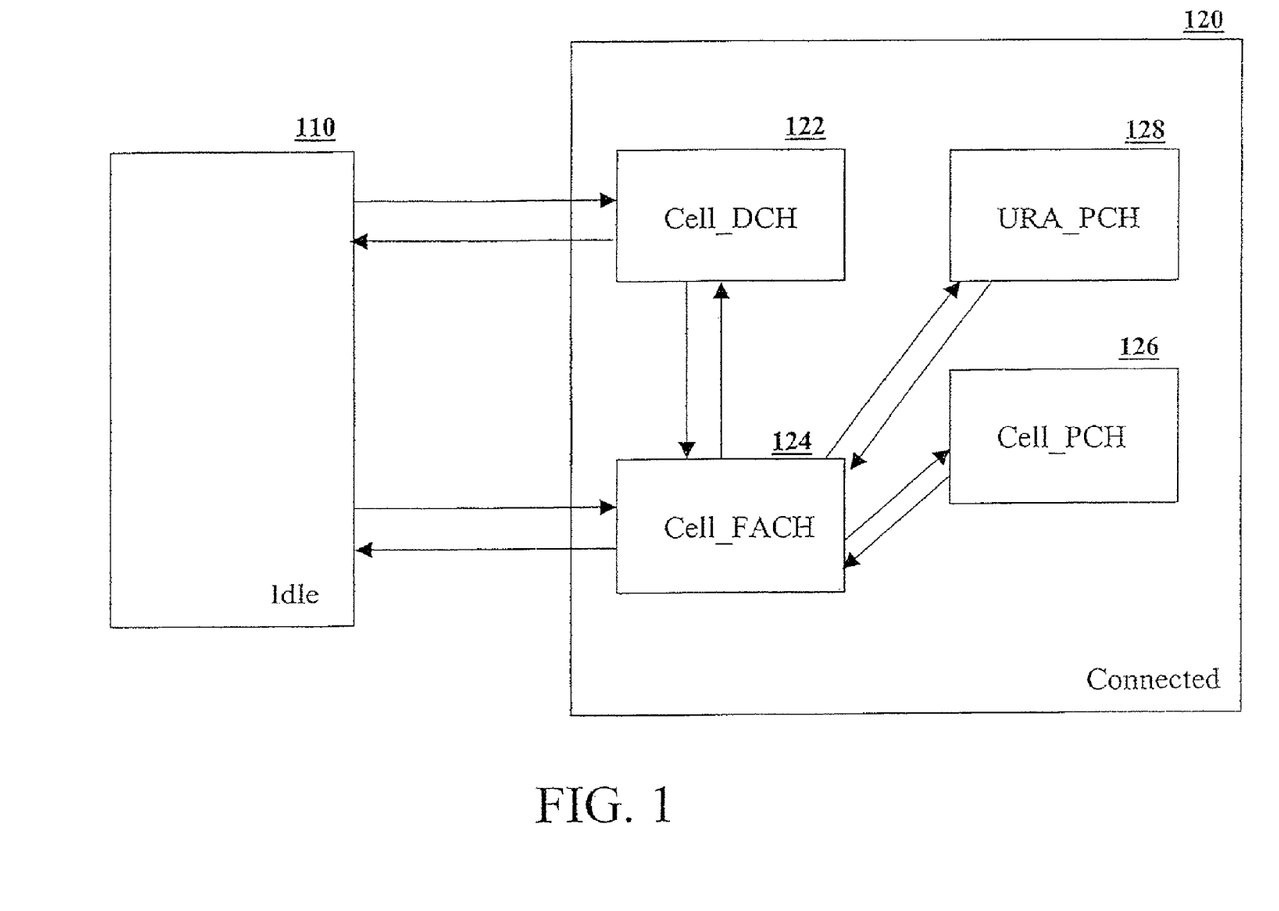
FIG. 1 is a block diagram showing RRC states and transitions.

Reference is now made to FIG. 1. FIG. 1 is a block diagram showing the various modes and states for the radio resource control portion of a protocol stack in a UMTS network. In particular, the RRC can be either in an RRC idle state 110 or an RRC connected state 120.

Figure 8:
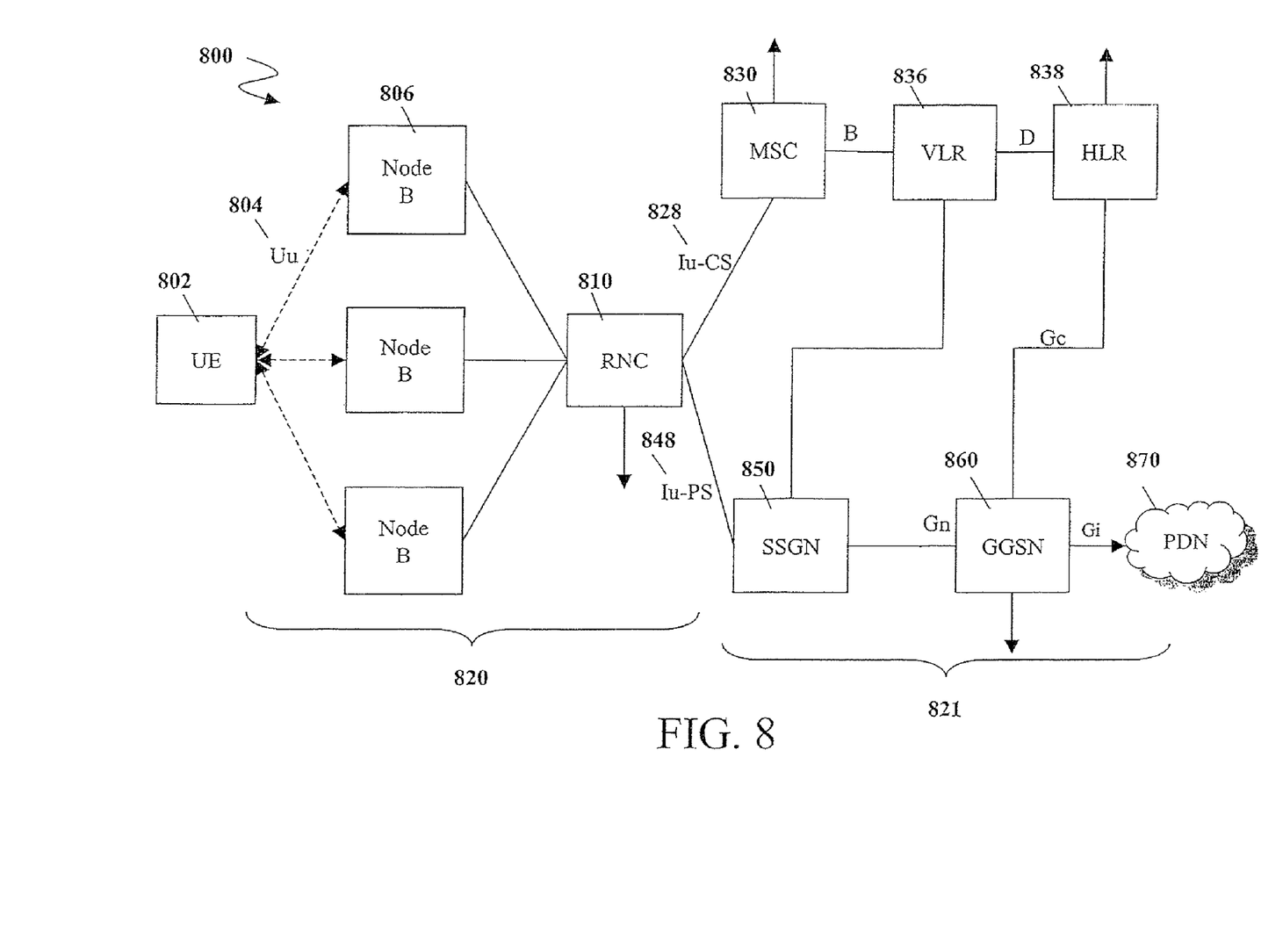
FIG. 8 is an exemplary network for use in association with the present method and apparatus.

As will be appreciated by those skilled in the art, a UMTS network consists of two land-based network segments. These are the Core Network (CN) and the Universal Terrestrial Radio-Access Network (UTRAN) (as illustrated in FIG. 8).

The Core Network is responsible for the switching and routing of data calls and data connections to the external networks while the UTRAN handles all radio related functionalities.

In idle mode 110, the UE must request an RRC connection to set up the radio resource whenever data needs to be exchanged between the UE and the network. This can be as a result of either an application on the UE requiring a connection to send data, or as a result of the UE monitoring a paging channel to indicate whether the UTRAN or SGSN has paged the UE to receive data from an external data network such as a push server. In addition, UE also requests RRC connection whenever it needs to send Mobility Management signaling message such as Location Area Update.

Once the UE has sent a request to the UTRAN to establish a radio connection, the UTRAN chooses a state for the RRC connection to be in. UTRAN also allocates initial radio resources for the RRC connection. This in turn determines the rate at which UE can exchange data. The allocated data rate and associated radio resources can be changed at any time by the UTRAN. Some infrastructures may provide a fixed initial rate regardless of the volume of pending data. The RRC connected mode 120 includes four separate states. These are CELL_DCH state 122, CELL_FACH state 124, CELL_PCH state 126 and URA_PCH state 128.

From idle mode 110 the RRC connected state can either go to the Cell Dedicated Channel (CELL_DCH) state 122 or the Cell Forward Access Channel (CELL_FACH) state 124.

In CELL_DCH state 122, a dedicated channel is allocated to the UE for both uplink and downlink to exchange data. This state, since it has a dedicated physical channel allocated to the UE, typically requires the most battery power from the UE.

Alternatively, the UTRAN can move from idle mode 110 to a CELL_FACH state 124. In a CELL_FACH state no dedicated channel is allocated to the UE. Instead, common channels are used to send signaling in a small amount of bursty data. However, the UE still has to continuously monitor the FACH, and therefore it consumes battery power.

Within the RRC connected mode 120, the RRC state can be changed at the discretion of the UTRAN. Specifically, if data inactivity is detected for a specific amount of time or data throughput below a certain threshold is detected, the UTRAN may move the RRC state from CELL_DCH state 122 to the CELL_FACH state 124, CELL_PCH state 126 or URA_PCH state 128. Similarly, if the payload is detected to be above a certain threshold then the RRC state can be moved from CELL_FACH 124 to CELL_DCH 122.

From CELL_FACH state 124, if data inactivity is detected for predetermined time in some networks, the UTRAN can move the RRC state from CELL_FACH state 124 to a paging channel (PCH) state. This can be either the CELL_PCH state 126 or URA_PCH state 128.

From CELL_PCH state 126 or URA_PCH state 128 the UE must move to CELL_FACH state 124 in order to initiate an update procedure to request a dedicated channel. This is the only state transition that the UE controls.

CELL_PCH state 126 and URA_PCH state 128 use a discontinuous reception cycle (DRX) to monitor broadcast messages and pages by a Paging Indicator Channel (PICH). No uplink activity is possible.

Figure 2:
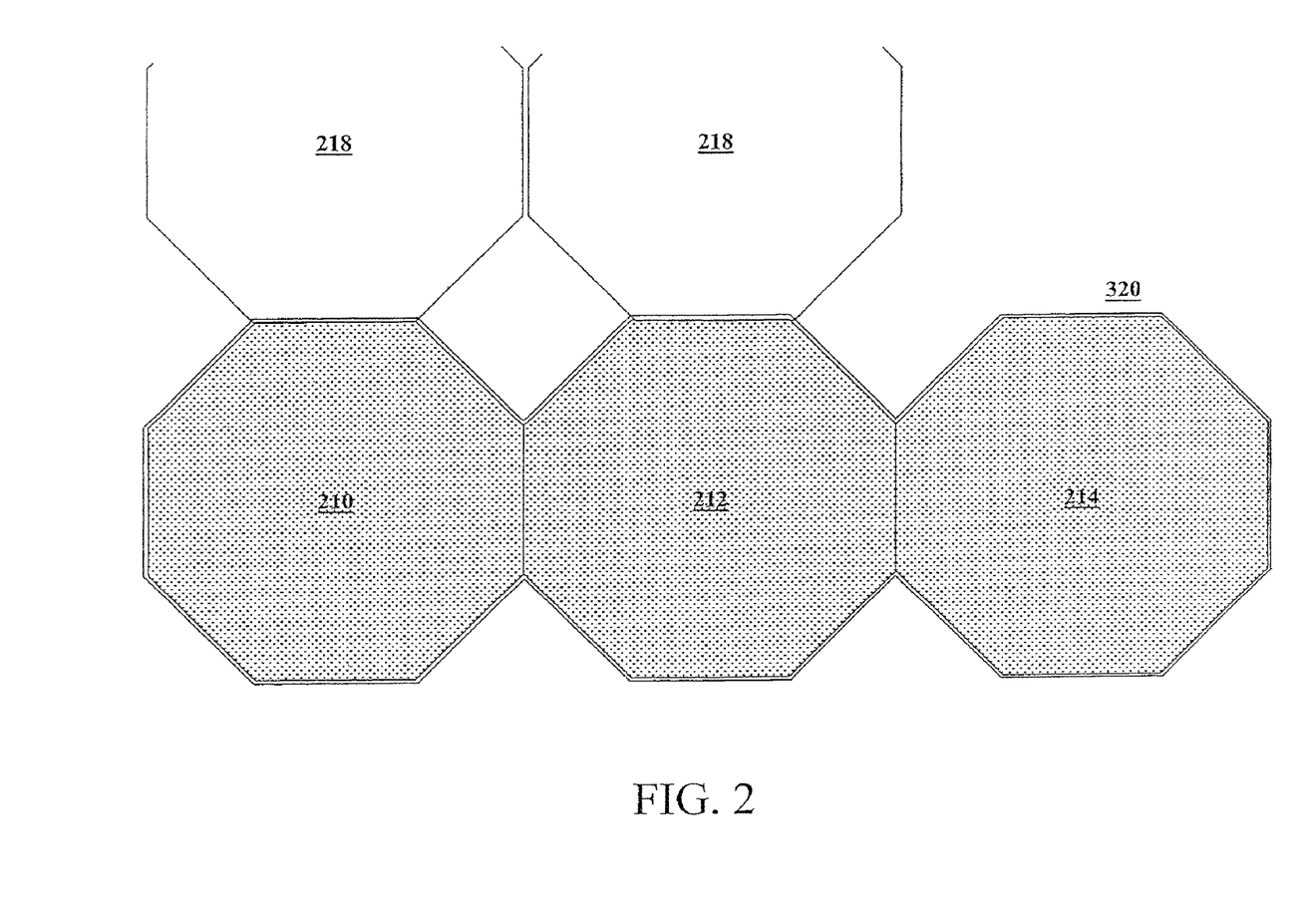
FIG. 2 is a schematic of a UMTS network showing various UMTS cells and a URA.

The difference between CELL_PCH state 126 and URA_PCH state 128 is that the URA_PCH state only triggers a URA Update procedure if the UEs current UTRAN registration area (URA) is not among the list of URA identities present in the current cell. Specifically, reference is made to FIG. 2. FIG. 2 shows an illustration of various UMTS cells 210, 212 and 214. All of these cells require a cell update procedure if reselected to a CELL_PCH state. However, in a UTRAN registration area, each will be within the same UTRAN registration area 220, and thus a URA update procedure is not triggered when moving between 210, 212 and 214 when in a URA_PCH mode.

As seen in FIG. 2, other cells 218 are outside the URA 220, and can be part of a separate URA or no URA.

As will be appreciated by those skilled in the art, from a battery life perspective the idle state provides the lowest battery usage compared with the states above. Specifically, because the UE is required to monitor the paging channel only at intervals, the radio does not need to continuously be on, but will instead wake up periodically. The trade-off for this is the latency to send data. However, if this latency is not too great, the advantages of being in the idle mode and saving battery power outweigh the disadvantages of the connection latency.

Reference is again made to FIG. 1. Various UMTS infrastructure vendors move between states 122, 124, 126 and 128 based on various criteria. These are default transition profiles and are applied to all UEs on that network. Exemplary infrastructures are outlined below.

In a first exemplary default infrastructure, the RRC moves between an idle mode and a Cell_DCH state directly. In the Cell_DCH state, if two seconds of inactivity are detected, the RRC state changes to a Cell_FACH state 124. If in Cell_FACH state 124, ten seconds of inactivity are detected then the RRC state changes to PCH state 126. Forty five minutes of inactivity in Cell_PCH states 126 will result in the RRC state moving back to idle mode 110.

In a second exemplary default infrastructure, RRC transition can occur between an idle mode 110 and connected mode 120 depending on a payload threshold. In the second infrastructure, if the payload is below a certain threshold then the UTRAN moves the RRC state to CELL_FACH state 124. Conversely, if the data is above a certain payload threshold then the UTRAN moves the RRC state a CELL_DCH state 122. In the second infrastructure, if two minutes of inactivity are detected in CELL_DCH state 122, the UTRAN moves the RRC state to CELL_FACH state 124. After five minutes of inactivity in the CELL-FACH state 124, the UTRAN moves the RRC stage to CELL_PCH state 126. In CELL_PCH state 126, two hours of inactivity are required before moving back to idle mode 110.

In a third default exemplary infrastructure, movement between idle mode and connected mode 120 is always to CELL_DCH state 122. After five seconds of inactivity in CELL_DCH state 122 the UTRAN moves the RRC state to CELL_FACH state 124. Thirty seconds of inactivity in CELL_FACH state 124 results in the movement back to idle mode 110.

In a fourth default exemplary infrastructure the RRC transitions from an idle mode to a connected mode directly into a CELL_DCH state 122. In the fourth exemplary infrastructure, CELL_DCH state 122 includes two sub-states. The first includes a sub-state which has a high data rate and a second sub-state includes a lower data rate, but still within the CELL_DCH state. In the fourth exemplary infrastructure, the RRC transitions from idle mode 110 directly into the high data rate CELL_DCH sub-state. After 10 seconds of inactivity the RRC state transitions to a low data rate CELL_DCH state. Seventeen seconds of inactivity from the low data CELL_DCH state 122 result in the RRC state changing it to idle mode 110.

The above four exemplary infrastructure shows how various UMTS infrastructure vendors are implementing the states. As will be appreciated by those skilled in the art, in each case, if the time spent on exchanging actual data (such as an email) is significantly short compared to the time that is required to stay in the CELL_DCH or the CELL_FACH states, this causes unnecessary current drain which makes user experience in newer generation networks such as UMTS worse than in prior generation networks such as GPRS and EDGE.

Further, although the CELL_PCH state is more optimal than the CELL_FACH state from a battery life perspective, the DRX cycle in a CELL_PCH state is typically set to a lower value than the idle mode 110. As a result, the UE is required to wake up more frequently in the CELL_PCH state than in an idle mode.

The URA_PCH state with a DRX cycle similar to that of the idle state is likely the optimal trade up between battery life and latency for connection. However, URA_PCH is currently not supported in the UTRAN. It is therefore desirable to quickly transition to the idle mode as quickly as possible after an application is finished with the data exchange from a battery life perspective.

It would be preferable, therefore, to be able to customize a transition profile for a UE based on a parameter received from the UE. This parameter could be the PDP context established with the UE and based on the APN specified at the UE. According to the PDP context, various static quality of service parameters could exist which could be used to set the transition profile for the UE. Alternatively, the APN could be stored at a network entity such as the HLR and provided by the HLR to the RNC. The HLR will be used for exemplary purposes below, but its use below is not meant to limit the present disclosure.

In an alternative embodiment, a quality of service detail could be specified by the UE and be used to set the transition profile for the UE. As will be appreciated by those skilled in the art, if a static quality of service based on the PDP context is used, then all users with the same PDP context will have the same transition profile. Conversely, a dynamic profile could be established if the user equipment is allowed to specify quality of service details. The dynamic QoS profile can be further based on a per PDP context basis (multiple primary or otherwise), and may be dynamically changed based on the UE application in use.

Figure 3:
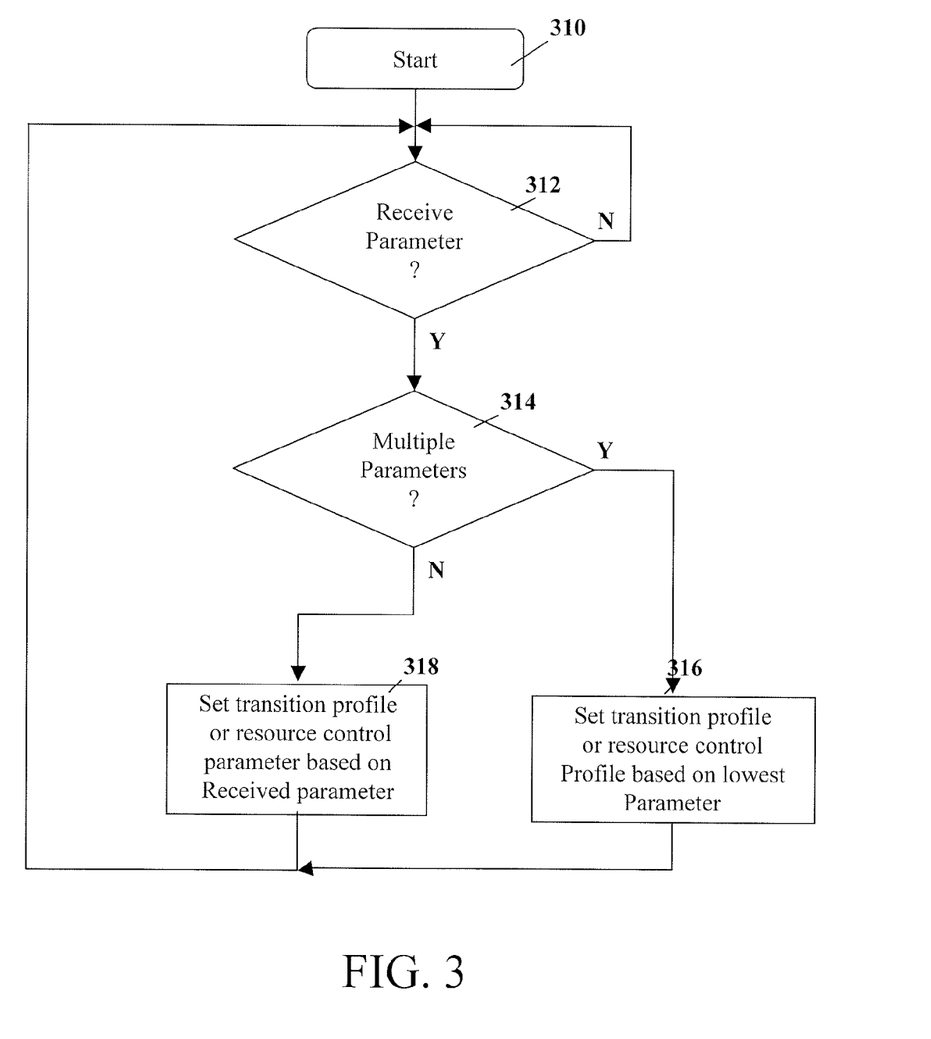
FIG. 3 is a flow chart of a preferred method.

Reference is now made to FIG. 3. FIG. 3 shows an exemplary flow chart of a method according to the present application. In FIG. 3 the UTRAN starts the process at step 310. The UTRAN process proceeds to step 312 in which it checks to see whether a parameter has been received. As will be appreciated by those skilled in the art, the parameter can be received from either the User Equipment or from the HLR. Thus, for example, the HLR stores subscription information and part of this goes to the RNC for Radio Bearer setup. This subscription information could include resource allocation information. The UE could also pass the information based on subscription or based on the application or applications running.

As will be appreciated by those skilled in the art, this parameter could be various data that could be useful in establishing a transition profile or resource allocation for the UE. Specifically, the PDP context and the APN specified by the UE could be used for setting the transition profile for the UE. Alternatively, the UE could set a quality of service parameter or dedicated message, or could use a subscription profile, which would then be passed to the UTRAN to set a transition profile.

The UTRAN could include or have access to a database or table in which various APNs or QoS parameters could be linked to a specific transition profile. Thus, if the UE is an always on device, this will be apparent from the APN and an appropriate transition profile for that APN could be stored at the UTRAN or be remotely accessible by the UTRAN. Similarly, if the QoS or a portion of the QoS parameter set by the UE is used, or a dedicated message sent with a profile, this could signify to the UTRAN that a particular transition profile is desired based on a database query or a lookup in a table. Additionally, a multiplicity of behaviors beyond the RRC connected state transition profile can be specified by this means. These include, but are not limited to:

rate adaptation algorithms (periodicity of step/step size);
initial granted radio bearer;
maximal granted radio bearer;
minimize call setup time (avoid unnecessary steps such as traffic volume measurements); and
the air interface (GPRS/EDGE/UMTS/HSDPA/HSUPA).

An exemplary case for such methods can be drawn for always on devices. As described, various APNs or QoS parameters can be linked to a specific behavior for always on. Consider an initial granted radio bearer that may be desirable based on 'always on' profile. The network now has a means to 'know' that data bursts are short and bursty for always-on applications, such as email. For those skilled in the art, it is clearly seen that given this information, there is no incentive to save code space for trunking efficiency on the network. Thus a maximum rate may be allocated to an always-on device with little risk of not reserving enough code space for other users. Additionally the UE benefits in receiving data more rapidly and also saves on battery life due to shorter 'on time'. Again, to those skilled in the art, high data rates have very little effect on current draw since power amplifiers are fully biased regardless of data rate.

Another example would be selection of air interface based on APN or QoS. For example, to those skilled in the art, it may be determined that one air interface is preferable for certain data exchange profiles. The definition of 'preferable' can be based on user experience, battery life, minimizing network utilization, or such similar considerations. In the case of battery life for always-on applications such as email, it is easy to determine that GPRS will provide for superior battery life by a 100% margin to UMTS.

This information is potentially received as a parameter in step 312. From step 312, if the UTRAN receives no new parameters from the UE or HLR, the UTRAN process loops back on itself and continues to wait for a parameter from the UE.

If, in step 312, a new parameter is received from the UE or HLR, the UTRAN process proceeds to step 314 in which it checks whether the UE in question has provided multiple parameters.

As will be appreciated, it may be possible to have multiple PDP contexts in certain cases. For example, if an email application is running at the same time as an instant messaging application, each can have a different PDP context.

If in step 314 it is determined that multiple parameters have been specified from the particular UE, the UTRAN process proceeds to step 316 in which a transition profile or resource allocation for the UE is set based on the lowest common denominator of the parameters specified by the UE. Specifically, if two PDP contexts are used and the second PDP context requires the UE to stay in a Cell_DCH state for a longer time period than the first PDP context, the UTRAN process will find the transition profile or resource allocation that has the longer delay before transitioning and use this transition profile. In this way, the UTRAN does not transition out of a connected state before an application is ready.

As will be further appreciated, other considerations, such as whether the PDP context has active resources could also be used to determine the transition profile or resource allocation.

For example, if multiple PDP contexts exist, but only one has active resources, the one PDP context with active resources could be used to specify the transition profile or the resource allocation.

If in step 314 multiple parameters have not been specified by the UE or HLR, the UTRAN process proceeds to step 318 in which the transition profile or resource allocation is set based on the parameters received in step 312.

As will further be appreciated, the parameters received in step 312 could be different for the same UE at different points in time. A UE may have a primary PDP context for certain applications, but use a secondary PDP context for other applications. Thus a UE may establish a secondary PDP context and have a different transition profile (or other RRC behavior described above) than if the UE had established a primary PDP context.

From either step 316 or 318 the UTRAN process proceeds back to step 312 and waits for more parameters from the UE or HLR.

The transition profile set can be used to indicate to the UTRAN that the UE should move out of a Cell_DCH state more quickly or that the UE state should make specific transitions. For example, in the first exemplary default infrastructure identified above, the RRC moves between a Cell_DCH state to a Cell_FACH state after two seconds of inactivity. For an always on device this might be too long since the always on device is expecting bursty traffic such as an email message. In this case, a transition may be preferable after one second of inactivity, for example.

Alternatively, instead of moving from the Cell_DCH state to the Cell_FACH state it may be preferable for the transition to occur directly from the Cell_DCH state to an idle mode thereby ensuring superior battery life performance and preventing the wasting of network resources.

This specific transition profile can be optimized for each PDP context in a static system or can be identified by the UE for a dynamic system in which the UE specifies the parameters for transition within the quality service details. The present application is not limited to a particular profile.

Additionally, if other RRC behaviors can be optimized for each PDP context statically or dynamically, the same logical methods maybe applied to setting minimum or maximum radio bearer assignments to the UE, or defining rate adaptation, or even particulars in the call set up process. Even the air interface itself (e.g. GPRS vs EDGE vs UMTS) within a particularly protocol family may be defined by such methods.

Figure 4:
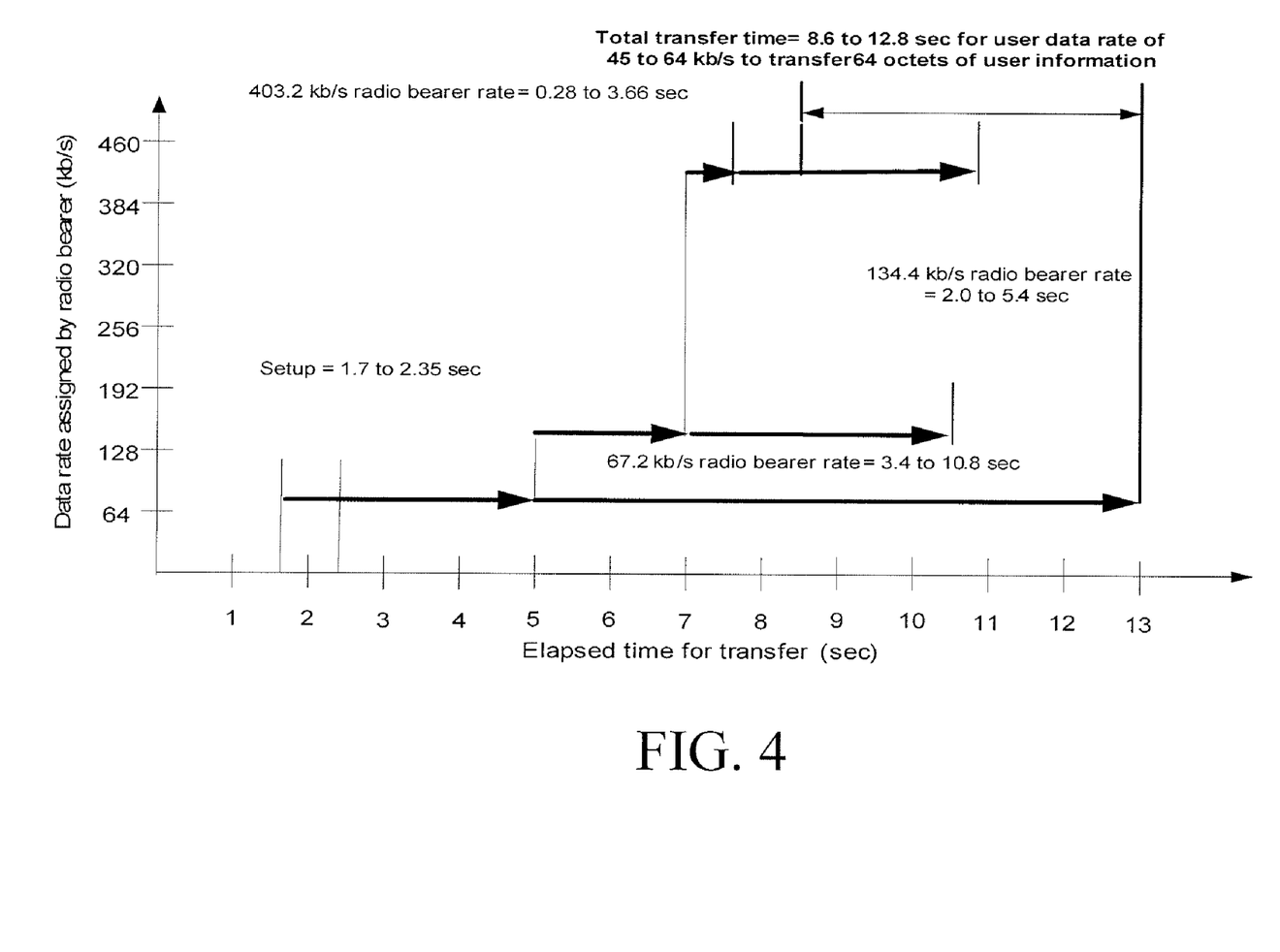
FIG. 4 is a block diagram showing a stair step transition for a prior art resource allocation for a particular subscription or PDP context.

Reference is now made to FIG. 4. FIG. 4 illustrates a profile of internal transfer characteristics of a file download. The diagram of FIG. 4 illustrates a profile of a typical UMTS user data transfer over a number of observations.

As illustrated in FIG. 4, the time required to set up a transfer ranges between 1.7 to 2.35 seconds in the example of FIG. 4. After the initial setup, the first radio bearer was assigned to 67.2 kb/s. The time for which the 67.2 kb/s radio bearer was assigned is greatly variable and ranged in the example of FIG. 4 from about 30.4 to 10.8 seconds.

The example of FIG. 4 illustrates that in some instances, the bearer rate never increased beyond 67.2 kb/s, but in most cases increased to 134.4 kb/s. The increased bearer rate remained assigned for 2.0 to 5.4 seconds.

In some cases, the bearer rate was increased to 403.2 kb/s, where it remained for 0.28 to 3.66 seconds.

The total transfer time in the example of FIG. 4 was variable and was 8.6 to 12.8 seconds to transfer a 64 Kbyte file. This equates to a user data rate of approximately 45 kb/s to 64 kb/s to transfer the 64 Kbyte file. A primary factor in determining the user data rate is the transfer setup time, which represents a significant portion of the total transfer time. In the example FIG. 4 the transfer setup time represents between 13 and 27% of the total transfer time.

Figure 5:
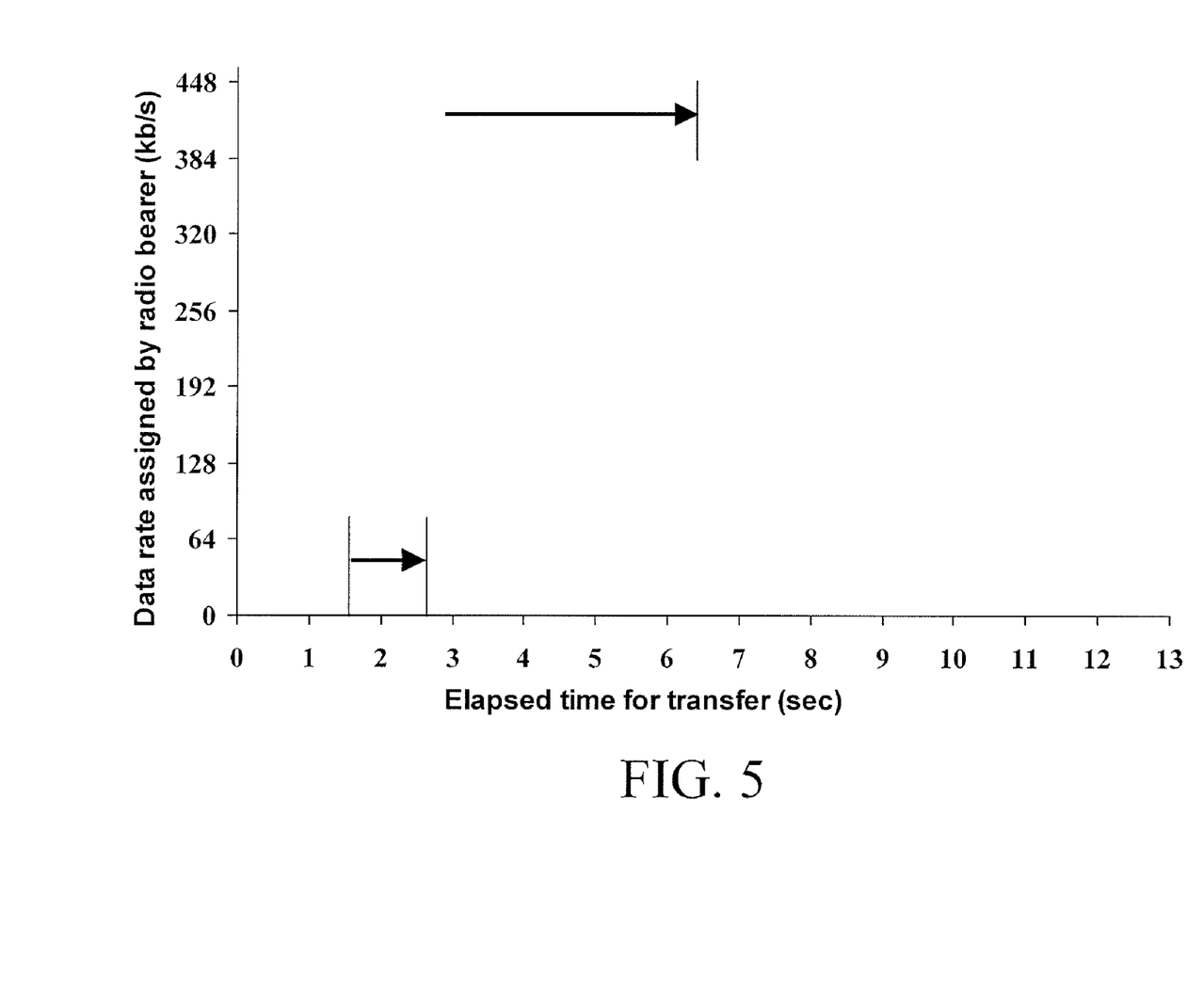
FIG. 5 is a block diagram showing an preferred stair step transition for a different resource allocation than that of FIG. 4.

Referring to FIG. 5, in the case where radio resource allocation is specified by the UE, the transfer time can be reduced and a high data rate can be assigned immediately by the radio bearer.

Thus, in FIG. 5, the setup time is still between 1.7 and 2.35 seconds. After this, the data rate assigned by the radio bearer immediately proceeds to 403.2 kb/s. As will be appreciated by those skilled in the art, this reduces the transfer time and therefore saves both network resources and battery power. There may be cases for short bursty data, the network can actually be more efficiently utilized by allocating higher data rates without concern for using up resources since the burst are short (in 3G parlance, concern for using Hadamard code space resources that would be tied up for other users).

Figure 6:
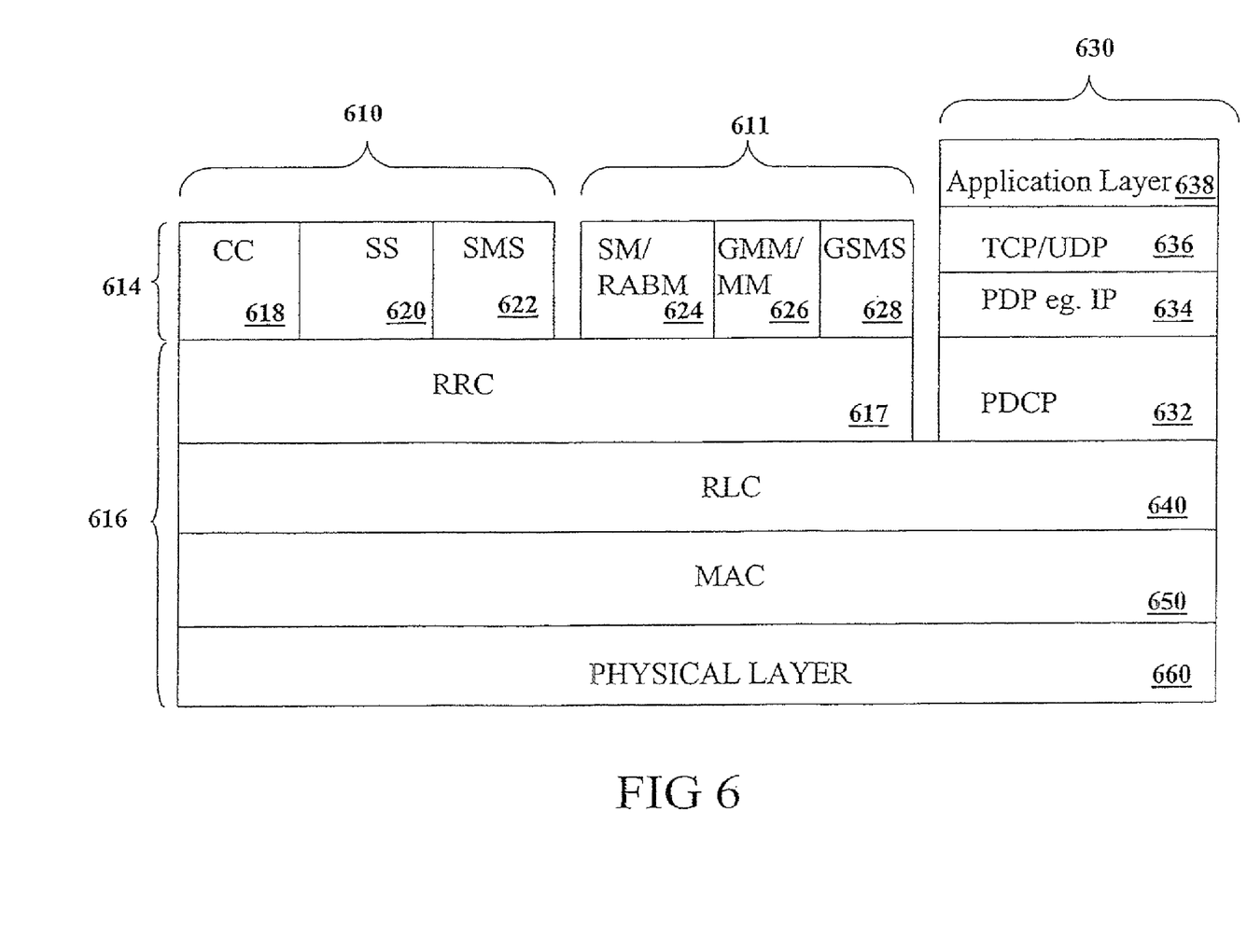
FIG. 6 is a block diagram of a UMTS protocol stack.

Reference is now made to FIG. 6. FIG. 6 illustrates a protocol stack for a UMTS network.

Reference is now made to FIG. 6. FIG. 6 illustrates a protocol stack for a UMTS network.

As seen in FIG. 6, the UMTS includes a CS control plane 610, PS control plane 611, and PS user plane 630.

Within these three planes, a non-access stratum (NAS) portion 614 and an access stratum portion 616 exist.

NAS portion 614 in CS control plane 610 includes a call control (CC) 618, supplementary services (SS) 620, and short message service (SMS) 622.

NAS portion 614 in PS control plane 611 includes both mobility management (MM) and GPRS mobility management (GMM) 626. It further includes SM/RABM 624 and GSMS 628.

CC 618 provides for call management signaling for circuit switched services. The session management portion of SM/RABM 624 provides for PDP context activation, deactivation and modification. SM/RABM 624 also provides for quality of service negotiation.

The main function of the RABM portion of the SM/RABM 624 is to connect a PDP context to a Radio Access Bearer. Thus SM/RABM 624 is responsible for the setup, modification and release of radio bearers.

CS control plane 610 and PS control plane 611, in the access stratum 616 sit on radio resource control (RRC) 617.

NAS portion 614 in PS user plane 630 includes an application layer 638, TCP/UDP layer 636, and PDP layer 634. PDP layer 634 can, for example, include internet protocol (IP).

Access Stratum 616, in PS user plane 630 includes packet data convergence protocol (PDCP) 632. PDCP 632 is designed to make the WCDMA protocol suitable to carry TCP/IP protocol between UE and RNC (as seen in FIG. 8), and is optionally for IP traffic stream protocol header compression and decompression.

The UMTS Radio Link Control (RLC) 640 and Medium Access Control (MAC) layers 650 form the data link sublayers of the UMTS radio interface and reside on the RNC node and the User Equipment.

The Layer 1 (L1) UMTS layer (physical layer 650) is below the RLC/MAC layers 640 and 650. This layer is the physical layer for communications.

Figure 7:
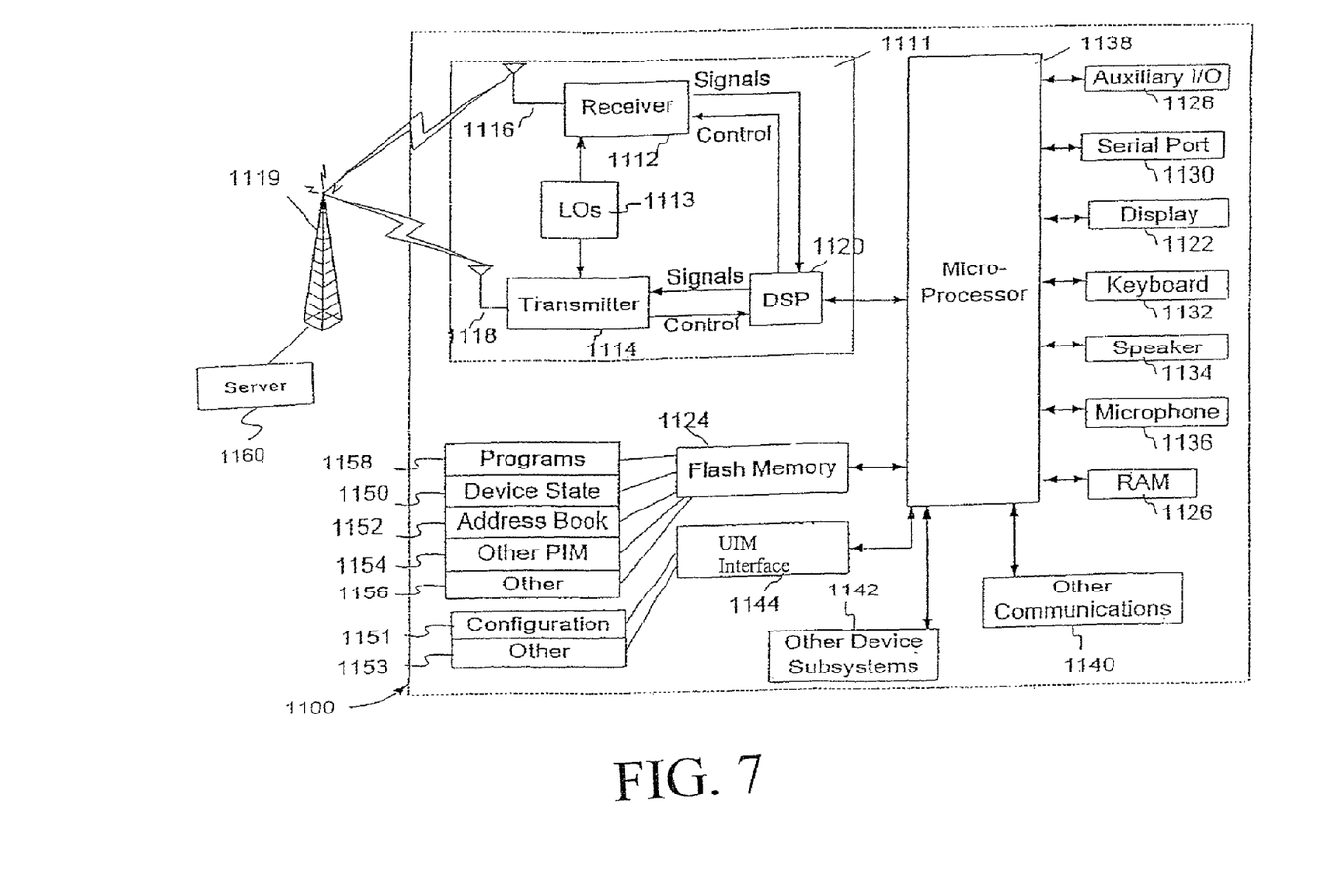
FIG. 7 is an exemplary UE that can be used in association with the present method.

While the above can be implemented on a variety of mobile devices, an example of one mobile device is outlined below with respect to FIG. 7. Reference is now made to FIG. 7.

UE 1100 is preferably a two-way wireless communication device having at least voice and data communication capabilities. UE 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, UE 1100 may include a communication subsystem 1111 designed to operate within the GPRS network or UMTS network.

Network access requirements will also vary depending upon the type of network 1119. For example, In UMTS and GPRS networks, network access is associated with a subscriber or user of UE 1100. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 1100 will be unable to carry out any other functions involving communications over the network 1100. The UIM interface 1144 is normally similar to a card-slot into which a card can be inserted and ejected like a diskette or PCMCIA card. The UIM card can have approximately 64K of memory and hold many key configuration 1151, and other information 1153 such as identification, and subscriber related information.

When required network registration or activation procedures have been completed, UE 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

UE 1100 preferably includes a microprocessor 1138 which controls the overall operation of the device. Communication functions, including at least data communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 7 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on UE 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the UE 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of UE 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of UE 1100 is similar, except that received signals would preferably be output to a speaker 1134 and signals for transmission would be generated by a microphone 1136. Alternative voice or audio I/O subsystems, such as a voice message recording subsystem, may also be implemented on UE 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 7 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to UE 1100 other than through a wireless communication network. The alternate download path may for example be used to load an encryption key onto the device through a direct and thus reliable and trusted connection to thereby enable secure device communication.

Alternatively, serial port 1130 could be used for other communications, and could include as a universal serial bus (USB) port. An interface is associated with serial port 1130.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices.

Reference is now made to FIG. 8. FIG. 8 is a block diagram of a communication system 800 which includes a UE 802 which communicates through a wireless communication network.

UE 802 communicates wirelessly with one of multiple Node Bs 806. Each Node B 806 is responsible for air interface processing and some radio resource management functions. Node B 806 provides functionality similar to a Base Transceiver Station in a GSM/GPRS networks.

The wireless link shown in communication system 800 of FIG. 8 represents one or more different channels, typically different radio frequency (RF) channels, and associated protocols used between the wireless network and UE 802. A Uu air interface 804 is used between UE 802 and Node B 806.

An RF channel is a limited resource that must be conserved, typically due to limits in overall bandwidth and a limited battery power of UE 802. Those skilled in art will appreciate that a wireless network in actual practice may include hundreds of cells depending upon desired overall expanse of network coverage. All pertinent components may be connected by multiple switches and routers (not shown), controlled by multiple network controllers.

Each Node B 806 communicates with a radio network controller (RNC) 810. The RNC 810 is responsible for control of the radio resources in its area. One RNC 810 control multiple Node Bs 806.

The RNC 810 in UMTS networks provides functions equivalent to the Base Station Controller (BSC) functions in GSM/GPRS networks. However, an RNC 810 includes more intelligence including, for example, autonomous handovers management without involving MSCs and SGSNs.

The interface used between Node B 806 and RNC 810 is an lub interface 808. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 820 comprises the RNC 810, Node B 806 and the Uu air interface 804.

Circuit switched traffic is routed to Mobile Switching Centre (MSC) 830. MSC 830 is the computer that places the calls, and takes and receives data from the subscriber or from PSTN (not shown).

Traffic between RNC 810 and MSC 830 uses the lu-CS interface 828. lu-CS interface 828 is the circuit-switched connection for carrying (typically) voice traffic and signaling between UTRAN 820 and the core voice network. The main signaling protocol used is RANAP (Radio Access Network Application Part). The RANAP protocol is used in UMTS signaling between the Core Network 821, which can be a MSC 830 or SSGN 850 (defined in more detail below) and UTRAN 820. RANAP protocol is defined in 3GPP TS 25.413 V3.11.1 (2002-09) and TS 25.413 V5.7.0 (2004-01).

For all UEs 802 registered with a network operator, permanent data (such as UE 102 user's profile) as well as temporary data (such as UE's 802 current location) are stored in a home location registry (HLR) 838. In case of a voice call to UE 802, HLR 838 is queried to determine the current location of UE 802. A Visitor Location Register (VLR) 836 of MSC 830 is responsible for a group of location areas and stores the data of those mobile stations that are currently in its area of responsibility. This includes parts of the permanent mobile station data that have been transmitted from HLR 838 to the VLR 836 for faster access. However, the VLR 836 of MSC 830 may also assign and store local data, such as temporary identifications. UE 802 is also authenticated on system access by HLR 838.

Packet data is routed through Service GPRS Support Node (SGSN) 850. SGSN 850 is the gateway between the RNC and the core network in a GPRS/UMTS network and is responsible for the delivery of data packets from and to the UEs within its geographical service area. lu-PS interface 848 is used between the RNC 810 and SGSN 850, and is the packet-switched connection for carrying (typically) data traffic and signaling between the UTRAN 820 and the core data network. The main signaling protocol used is RANAP (described above).

The SSGN 850 communicates with the Gateway GPRS Support Node (GGSN) 860. GGSN 860 is the interface between the UMTS/GPRS network and other networks such as the Internet or private networks. GGSN 860 is connected to a public data network PDN 870 over a Gi interface.

Those skilled in art will appreciate that wireless network may be connected to other systems, possibly including other networks, not explicitly shown in FIG. 8. A network will normally be transmitting at very least some sort of paging and system information on an ongoing basis, even if there is no actual packet data exchanged. Although the network consists of many parts, these parts all work together to result in certain behaviours at the wireless link.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for dynamic resource allocation in a Radio Resource Control (RRC) layer comprising:
using a resource control profile to define radio resource allocation and state-transitions for a user equipment (UE);
during operation of the UE, modifying the radio resource allocation or state-transitions defined by the resource control profile based on information associated with the UE, the information being a parameter specified by the UE; and
comparing the specified parameter with any previously received parameter from the UE, each parameter having a different transition profile with a transition period from an RRC state associated therewith,
wherein the modifying step includes selecting the transition profile based on the parameter having the longest transition period.

2. The method of claim 1, said modifying including customizing the resource control profile wherein at least one of thresholds for transitioning from one to another of predetermined number of states is changed.

3. The method of claim 1, including controlling the UE with the modified resource control profile.

4. The method of claim 1, the resource control profile defining resource and inactivity thresholds for transitioning from one to another of a predetermined number of states.

5. The method of claim 1, including associating the parameter with a radio resource allocation profile or a state-transition profile.

6. The method of claim 5, wherein the associating step comprises looking up the parameter in a look-up table or database and finding a corresponding radio resource allocation or state transition profile.

7. The method of claim 6, wherein the look-up table or database is stored on the UTRAN.

8. The method of claim 6, wherein the look-up table or database is stored remotely from the UTRAN.

9. The method of claim 1, wherein the parameter is received from one of the UE, a network entity and a Home Location Register (HLR) or a dedicated message.

10. The method of claim 1, wherein the parameter is one of an Access Point Name (APN) used to create a Packet Data Protocol (PDP) context, a Quality of Service parameter set by the UE, a Quality of Service allocation retention priority parameter, a subscription profile of the UE or specified by the UE indicative of subscription for which an RRC connection is to be established.

11. The method of claim 1, further comprising checking whether a PDP context associated with the received parameter has radio resources allocated to it, and if no, ignoring the parameter.

12. The method of claim 1, wherein the radio resource allocation profile comprises an allocation selected from the group consisting of: rate adaptation algorithms including periodicity of step and step size; initial granted radio bearer; maximal granted radio bearer; minimize call setup time by avoiding unnecessary steps such as traffic volume measurements; and allocation between different radio access technologies.

13. A UTRAN in a UMTS network, the UTRAN configured to:
  use a resource control profile to define radio resource allocation and state-transitions for a user equipment (UE);
  during operation of the UE, modify the radio resource allocation or state-transitions defined by the resource control profile based on information associated with the UE, the information being a parameter specified by the UE; and
  compare the specified parameter with any previously received parameter from the UE, each parameter having a different transition profile with a transition period from an RRC state associated therewith,
  wherein the modifying includes selecting the transition profile based on the parameter having the longest transition period.

14. The UTRAN of claim 13, wherein the modifying including customizing the resource control profile wherein at least one of thresholds for transitioning from one to another of predetermined number of states is changed.

15. A user equipment (UE) adapted to facilitate for dynamic resource allocation in a Radio Resource Control (RRC) layer the UE configured to:
  use a resource control profile to define radio resource allocation and state-transitions for a user equipment (UE);
  during operation of the UE, modify the radio resource allocation or state-transitions defined by the resource control profile based on information associated with the UE, the information being a parameter specified by the UE; and
  compare the specified parameter with any previously received parameter, each parameter having a different transition profile with a transition period from an RRC state associated therewith,
  wherein the modifying includes selecting the transition profile based on the parameter having the longest transition period.

16. The UE of claim 15, wherein the modifying including customizing the resource control profile wherein at least one of thresholds for transitioning from one to another of predetermined number of states is changed.

* * * * *